2,813,847

ART OF PRODUCING COPOLYMERS OF CYANOALKYL VINYL ETHERS

David C. Guth, Norwalk, and Frederic C. Schaefer, Darien, Conn., assignors to American Cyanamid Company, New York, N. Y., a corporation of Maine No Drawing. Application December 30, 1954, Serial No. 478,916

8 Claims. (Cl. 260—80.5)

This invention relates to the production of new materials having valuable and characteristic properties that make them especially suitable for use in industry, for example in molding, casting, coating, laminating, electrically insulating, fiber-forming and adhesive applications, and for other purposes. More particularly the invention is concerned with a method of preparing products comprising a copolymer obtained by polymerization of a mixture of copolymerizable ingredients including (1) a cyanoalkyl vinyl ether represented by the general formula I  $CN-R-O-CH=CH_2$ where R represents a divalent saturated aliphatic hydrocarbon radical containing from 1 to 6 carbon atoms, inclusive, e. g., methyl, ethyl, propyl, isopropyl, butyl, isobutyl, sec.-butyl, tert.-butyl, amyl, isoamyl, hexyl, etc., and more particularly such a radical containing from 1 to 6 carbon atoms, inclusive, and (2) a compound which is different from the compound of (1), is copolymerizable therewith and which contains a single $CH_2=C<$ grouping or a plurality of such groupings, more particularly classes and sub-classes of such compounds such as those hereinafter set forth, and specifically N-vinyl-2-oxazolidone, acrylonitrile, ethyl acrylate, vinyl acetate, acrylamide, styrene, 2-methyl-5-vinyl-pyridine, etc., the cyanoalkyl vinyl ether of (1) constituting from about 5% to about 65%, and preferably from about 10 or 15% to about 50 or 60%, of the total amount of (1) and (2).

The claims in the present application are directed specifically to a method of preparing copolymers of acrylonitrile and a cyanoalkyl vinyl ether of the kind embraced by Formula I.

At least some the the cyanoalkyl vinyl ethers embraced by Formula I are believed to be new chemical compounds; others may have been known prior to our invention. However, to the best of our knowledge and belief it was not known prior to our invention that such vinyl ethers, which are difficult (and often impossible under the usual polymerization conditions) to polymerize to a useful product, could be copolymerized with different compounds containing a $CH_2=C<$ grouping in the particular proportions employed in carrying the present invention into effect (or in any other proportions) to produce a new series of copolymer compositions having particular and characteristic properties that make them especially suitable for use in the plastics, coating and other arts. The nitrogen content of the cyanoalkyl vinyl ethers imparts valuable properties, e. g., improved arc-extinguishing and/or flame-resisting characteristics, to many of the copolymer compositions of the invention, while the vinyl grouping permits the aforesaid vinyl ether to undergo a copolymerization reaction with other ethylenically unsaturated monomers, such copolymerizations being activated by the presence of the cyanoalkyl grouping. Another unexpected and unpredictable advantage flowing from our invention resides in the fact that the presence of the cyano group seems to improve the compatibility characteristics of the monomer with other polymerizable cyano compounds, e. g., acrylonitrile, whereby copolymers of improved plasticity or flow characteristics are obtained. This is a matter of considerable practical importance in the production of many commercial products, for instance in the production of oriented fibers comprised of an acrylonitrile copolymer.

It is one of the primary objects of the present invention to provide a method of preparing copolymers of acrylonitrile and certain cyanoalkyl vinyl ethers.

Another object of the invention is to improve the usefulness of cyanoalkyl vinyl ethers of the kind embraced by Formula I whereby their field of usefulness is enhanced.

Other objects of the invention will be apparent to those skilled in the art from the following more detailed description.

The foregoing objects are attained by copolymerization of 2-cyanoalkyl vinyl ether and/or other ether embraced by Formula I with one or more other compounds which is different from the said vinyl ether, is copolymerizable therewith and contains a $CH_2=C<$ grouping (i. e., either a single $CH_2=C<$ grouping or a plurality of $CH_2=C<$ groupings), using, by weight, from about 5% to about 65% of the aforesaid ether, and from about 95% to about 35% of a different comonomer (or comonomers) containing one or more $CH_2=C<$ groupings. With lower proportions of the cyanoalkyl vinyl ether the desired improvement in useful properties is generally not attained, and with higher proportions the copolymerization reaction ordinarily is either not readily effected by the usual copolymerization technique or within a reasonable or commercially practical period of time.

Examples of monomers (comonomers) containing a $CH_2=C<$ grouping that can be copolymerized with a cyanoalkyl vinyl ether of the kind embraced by Formula I in the weight proportions hereinbefore mentioned, singly or a plurality (two, three, four or any desired number) thereof, the latter often being desirable in order to improve the compatibility characteristics of the mixture of monomers and to obtain new and valuable copolymers having the particular properties desired for a particular service application, have been given hereinbefore while others are given in the examples and in the portion of the instant specification following the examples. Additional examples are given in, for instance, Drechsel and Padbury U. S. Patent No. 2,550,652, column 2, line 44, through line 59, in column 4, and in the Kropa patent referred to therein.

Heat, light or heat and light can be used to effect or to accelerate polymerization of the mixture of comonomers, although under such conditions the rate of polymerization may be relatively slow. Hence, it is usually preferred to accelerate the polymerization by employing a polymerization catalyst accompanied by heat, light or heat and light. Ultraviolet light is more effective than ordinary light.

Any of the polymerization catalysts which are suitable for use in polymerizing compounds containing an ethylenically unsaturated grouping, specifically a vinyl grouping, can be employed. Among such catalysts are the inorganic peroxides, e. g., hydrogen peroxide, barium peroxide, magnesium peroxide, etc., and the various organic peroxy catalysts, illustrative examples of which latter are: the dialkyl peroxides, e. g., diethyl peroxide, dipropyl peroxide, dilauryl peroxide, dioleyl peroxide, distearyl peroxide, di-(tert.-butyl) peroxide and di-(tert.-amyl) peroxide, such peroxides often being designated as ethyl, propyl, lauryl, oleyl, stearyl, tert.-butyl and tert.-amyl peroxides; the alkyl hydrogen peroxides, e. g., tert.-butyl hydrogen peroxide (tert.-butyl hydroperoxide), tert.-amyl hydrogen peroxide (tert.-amyl hydroperoxide), etc.; symmetrical diacyl peroxides, for instance peroxides which commonly are known under such names as acetyl peroxide, propionyl peroxide, lauroyl peroxide, stearoyl peroxide, malonyl peroxide, succinyl peroxide, phthaloyl peroxide, benzoyl peroxide, etc.; fatty oil acid peroxides, e. g., coconut oil acid peroxides, etc.; unsymmetrical or mixed diacyl peroxides, e. g., acetyl benzoyl peroxide, propionyl benzoyl peroxide, etc.; terpene oxides, e. g., ascaridole, etc.; and salts of inorganic per-acids, e. g., ammonium persulfate, sodium persulfate, potassium persulfate, sodium percarbonate, potassium percarbonate, sodium perborate, potassium perborate, sodium perphosphate, potassium perphosphate, etc. Other catalysts which, like the peroxy catalysts (numerous examples of which have been given above), accelerate polymerization as the result of the liberation of a free radical, e. g., sym.-dicyanotetramethylazomethane and similar known azo polymerization catalysts, also can be employed. Various reduction-oxidation ("redox") catalyst systems also can be used advantageously in many instances. Other examples of organic peroxide and of other catalysts that can be employed are given, for example, in Drechsel and Padbury Patent No. 2,550,652 dated April 24, 1951, including ionic polymerization catalysts and, more particularly, p-toluene sulfonic acid, sulfuric acid, phosphoric acid, aluminum chloride, stannic chloride, ferric chloride, boron trifluoride, boron trifluoride-ethyl ether complex, and iodine.

The concentration of the catalyst employed is usually small, that is, for the preferred catalysts from, by weight, about 0.5 to 1 part of catalyst per thousand parts of the polymerizable composition to be polymerized to about 3 or 4 or more parts of catalyst per 100 parts of the mixture of comonomers.

If desired, the mixed monomers can be polymerized in emulsion or in solution state to yield a copolymer. In the latter case, various inert organic solvents may be employed, depending upon the particular comonomer used, e. g., toluene, xylene, dioxane, ethers (e. g., dibutyl ether), esters (e. g., butyl acetate), chlorobenzene, ethylene dichloride, ketones (e. g., methyl ethyl ketone), tertiary alcohols, for instance tertiary-butyl alcohol, tertiary-amyl alcohol, tertiary-hexyl alcohol, etc., as well as others. When the reaction is effected in solution state, then a temperature at or approaching the boiling temperature of the solution generally is used. The copolymer can be separated from the liquid medium in which copolymerization was effected by any suitable means, e. g., by filtration, centrifuging, solvent extraction, etc.

The polymerization also can be effected by conventional bulk polymerization technique, in the presence or absence of a solvent capable of dissolving the monomeric mixture and in which the latter preferably is inert; or in solution in a solvent in which the monomeric mixture is soluble but the copolymer is insoluble; or by conventional bead polymerization methods. The polymerization of the mixture of monomers can be effected by a continuous process as well as by a batch operation. In one method of copolymerization, which is generally satisfactory, the monomers are copolymerized in an aqueous medium, with the aid of a polymerization catalyst, and the resulting copolymer is then isolated by any suitable means, e. g., by filtration, centrifuging, etc., from the aqueous medium in which polymerization has been effected.

The temperature of polymerization of the polymerizable composition, at atmospheric or slightly above atmospheric pressure and in the presence or absence of a polymerization catalyst, can be varied over a wide range, up to and including or slightly above the boiling point (at atmospheric pressure) of the monomeric mixture (or of the lowest boiling component thereof), but in all cases is below the decomposition temperature of the monomeric materials. In most cases the polymerization temperature will range to 150° C., more particularly within the range of about 30° C. to about 130° C., depending for example, upon the particular mixture of monomers employed, the particular catalyst, if any, used, the rapidity of polymerization wanted, and other influencing factors.

In order that those skilled in the art better may understand how the present invention can be carried into effect, the following examples are given by way of illustration and not by way of limitation. All parts and percentages, unless otherwise stated, are by weight.

EXAMPLE 1

This example illustrates the preparation of 2-cyanoethyl vinyl ether,

II      $CN—CH_2—CH_2—O—CH=CH_2$ which also may be named α-vinyloxypropionitrile.

|  | Parts | Approx. Molar Ratio |
|---|---|---|
| Lactonitrile | 71.00 | 1 |
| Vinyl acetate | 344.00 | 4 |
| Copper napthenate, approx. | 0.001 |  |
| Mercuric acetate | 3.6 |  |
| Sulfuric acid | 0.54 |  |

The reaction mixture is prepared at 25° C. by mixing the reactants in the order given above. There is an immediate, mild, exothermic reaction, but the reaction mass is held at 25° C. A cherry-red color appears almost at once and persists for five minutes. Aliquots which are removed and titrated at intervals shows that the reaction has produced 51% (0.51 mole) of the theoretical acetic acid in 40 minutes and that further reaction would be very sluggish. At this point the reaction mass is poured into a vigorously stirred solution of sodium carbonate in 1000 parts of water. The organic phase is separated after a few minutes, washed with dilute aqueous sodium carbonate solution, and dried over calcium sulfate. Fractional distillation after stripping off the unreacted vinyl acetate yields 2-cyanoethyl vinyl ether, B. P. 63–63.5° C. at 57 mm. pressure, $n_D^{25}$ 1.4085.

EXAMPLE 2

Cyanomethyl vinyl ether,

III      $CN—CH_2—O—CH=CH_2$ which also may be named vinyloxyacetonitrile, is prepared in a manner similar to that described under Example 1 for the preparation of 2-cyanoethyl vinyl ether with the exception that an equivalent amount of glycolonitrile is used instead of 71 parts of lactonitrile.

Other cyano-(lower alkyl) vinyl ethers of the kind embraced by Formula I can be similarly prepared from the corresponding hydroxynitrile. These methods are essentially the same as the general method described by Adelman for the production of vinyl ethers [J. A. C. S., 75, 2678 (1953)]. However, the vinyl ethers used in practicing this invention can also be produced by other methods.

The following examples illustrate the production of copolymers of this invention.

EXAMPLE 3

|  | Parts |
|---|---|
| 2-cyanoethyl vinyl ether | 10.0 |
| Acrylonitrile | 90.0 |
| Water | 900.0 |
| Ammonium persulfate | 0.5 |

All of the above ingredients with the exception of the ammonium persulfate are mixed together and adjusted to a pH of 9 with sodium hydroxide. The resulting solution is deaerated by passing a rapid stream of pre-purified nitrogen gas over its surface for 30 minutes. The ammonium persulfate is then added, and the reaction mixture is heated for 4 hours at 60° C. while stirring and continuing the flow of nitrogen gas over the surface. The copolymer of acrylonitrile and 2-cyanoethyl vinyl ether which results is collected on a Büchner funnel and washed with 2000 parts of deionized water. The filter cake is pressed dry and then dried in a 70° C. forced-draft oven for about 16 hours. A nitrogen analysis of the dry copolymer indicates that it contains, by weight, about 18% 2-cyanoethyl vinyl ether and 82% acrylonitrile. This copolymer has better plastic flow and is more readily molded under heat than a similarly prepared, unplasticized homopolymer of acrylonitrile.

EXAMPLE 4

Example 3 is repeated substituting 10 parts of cyanomethyl vinyl ether for 10 parts of 2-cyanoethyl vinyl ether thereby to obtain a copolymer of acrylonitrile and cyanomethyl vinyl ether which, like the copolymer of Example 1, has improved plasticity under heat as compared with a similarly prepared, unplasticized homopolymer of acrylonitrile.

EXAMPLE 5

Same as in Example 3 with the exception that 5 parts, instead of 10 parts, of 2-cyanomethyl vinyl ether is employed.

EXAMPLE 6

Same as in Example 4 with the exception that 15 parts, instead of 10 parts, of cyanomethyl vinyl ether is used.

Any of the other cyano-(lower alkyl) vinyl ethers embraced by Formula I can be substituted, in whole or in part, for those employed in the foregoing examples to form copolymers of varying proportions thereof with acrylonitrile.

EXAMPLE 7

To a homogeneous mixture of 35 parts of N-vinyl-2-oxazolidone (about 90% pure) and 65 parts of 2-cyanoethyl vinyl ether is added 3 parts of alpha-alpha'-azodi-isobutyronitrile, and the mixture is then placed in an oven maintained at 60° C. to yield a copolymer of N-vinyl-2-oxazolidone and 2-cyanoethyl vinyl ether, varying in characteristics from a viscous liquid to a hard solid depending upon the time of heating the mixed monomers.

Other cyano-(lower alkyl) vinyl ethers embraced by Formula I can be substituted, in whole or in part, for 2-cyanoethyl vinyl ether in the above example.

Preparation of N-vinyl-2-oxazolidone

The N-vinyl-2-oxazolidone used in this and subsequent examples is prepared, for instance, from N-(β-chloroethyl)-2-oxazolidone by a reaction that may be illustrated by the following equation:

IV

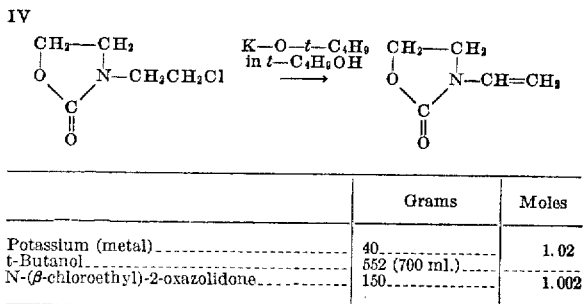

|  | Grams | Moles |
|---|---|---|
| Potassium (metal) | 40 | 1.02 |
| t-Butanol | 552 (700 ml.) | |
| N-(β-chloroethyl)-2-oxazolidone | 150 | 1.002 |

Three slugs of potassium metal (16 g. each) are transferred into a beaker of toluene to remove the mineral oil. The slugs, now free of oil, are carefully weighed into a second beaker of toluene, cutting the metal to get exactly 40 g. Meanwhile 552 g. of t-butanol has been placed in a 1-liter flask fitted with thermometer and stirrer. The potassium slugs (40 g.) are now cut (under toluene) down to the size of large peas and gradually added to the t-butanol. This requires cooling at first, but warming is needed to dissolve the last traces of metal. A carefully weighed sample of the clear solution is then titrated to a phenolphthalein end point. The total solution contains 570 g. × .00171 eq./g. = 0.975 equivalents

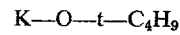

To this, 25 ml. of a previously prepared 1.14 N solution of K—O—t—C$_4$H$_9$ is added, so that the final solution contains exactly 1.00 equivalent of base.

The 1-liter reaction flask is fitted with a reflux condenser and a dropping funnel containing the carefully weighed N-(β-chloroethyl)-2-oxazolidone. The t-butanol solution is then warmed on a steam-bath to 60° C., and the addition of chloro compound is begun. Insoluble potassium chloride separates immediately and the exotherm reaction carries the temperature to reflux (85° C.). The addition is continued, maintaining gentle reflux over a 2.5-hour period. This reaction mixture is stirred gently at reflux for about 20 hours. At the end of this time a carefully weighed sample of the reaction slurry is titrated as before and the results indicate the reaction to be 88% complete.

The reaction mass is then filtered or it can be centrifuged to isolate the solid. The solid is re-slurried twice with 250 ml. benzene and again filtered and washed with additional benzene. The filtrates and washings are combined, treated with decolorizing carbon and again filtered. An additional 500 ml. benzene is now added to the essentially colorless solution and stripping of solvent begun, keeping the pot temperature below 50° C. with the help of an aspirator. During this time a pinch of hydroquinone is added as an inhibitor. The dark crude solvent-free N-vinyl-2-oxazolidone weighs 90 g. (theory=113 or 79.6%). On distillation 46 g. of product boiling sharply at 70° C./0.1 mm. is recovered. An iodine value determination (bromide-bromate method) gives a value of 201 (theory=224); this indicates a purity of 90%. Infrared curve F-5389 shows strong absorption at 1620 cm.$^{-1}$. A small sample of this N-vinyl-2-oxazolidone is cooled with Dry Ice. When the temperature reaches −32° C. crystallization begins and the heat of fusion carries to −15° C. Hence the melting point is about −15° C.; $n_D^{25}$ 1.4939.

EXAMPLE 8

| | Parts |
|---|---|
| 2-Cyanoethyl vinyl ether | 5.0 |
| N-vinyl-2-oxazolidone | 20.0 |
| Ethyl acrylate | 25.0 |
| Benzene | 500.0 |
| Benzoyl peroxide | 0.5 | are heated together under reflux at the boiling temperature of the mass for 5 hours. The resulting viscous solution containing a ternary polymer of 2-cyanoethyl vinyl ether, ethyl acrylate and the aforementioned oxazolidone is cooled, and the content of copolymer solids is determined by oven drying for 2 hours at 150° C. Films, sheets, tapes, ribbons and other castings dried from the benzene solution of the copolymer are clear and tough. The copolymer of this example is suitable for use as a component of coating compositions.

Instead of ethyl acrylate, other comonomers, more particularly other esters of acrylic acid, e. g., methyl acrylate, propyl acrylate, isopropyl acrylate, n-butyl acrylate, isobutyl acrylate, sec.-butyl acrylate, tert.-butyl acrylate, amyl acrylate, hexyl acrylate, propenyl acrylate, cyclohexyl acrylate, phenyl acrylate, benzyl acrylate, etc., can be substituted in the above formulation thereby to obtain copolymer compositions of varying properties. Also, instead of 2-cyanoethyl vinyl ether one can substitute, in whole or in part, any of the other vinyl ethers embraced by Formula I.

EXAMPLE 9

| | Parts |
|---|---|
| Styrene | 180.0 |
| Cyanomethyl vinyl ether | 10.0 |
| N-vinyl-2-oxazolidone | 10.0 |
| 25% solution of dioctyl sodium sulfo-succinate in water | 20.0 |
| Water | 580.0 |
| Ammonium persulfate | 0.1 | are charged to a 3-necked reaction vessel equipped with a stirrer and a reflux condenser. The mixture is stirred vigorously while heating on a steam bath for 80 minutes, at the end of which period refluxing has ceased. Steam is now passed through the emulsion for 15 minutes to remove residual monomers. A small amount of coagulated copolymer is filtered out of the stable emulsion of the copolymer of styrene, cyanomethyl vinyl ether and N-vinyl-2-oxazolidine.

The copolymer latex may be used as a coating composition or as a component of such compositions. For example, it may be applied to a surface of glass, metal, wood or other material to be protectively finished, and the coated article then heated for from 1 to 3 hours at a temperature of the order of 120° C. to 140° C. to evaporate the water and to solidify the coating therefrom.

The copolymer may be precipitated, if desired, from the aqueous emulsion thereof by adding a coagulating agent such, for instance, as salts (e. g., salts of polyvalent metals such as aluminum sulfate, magnesium chloride, barium chloride, etc., salts of monovalent metals such as sodium chloride, sodium sulfate, etc.), acids, e. g., formic acid, acetic acid, phosphoric acid, hydrochloric acid, etc., sulfides, e. g., magnesium sulfide, etc. The coagulated copolymer is separated from the aqueous phase, water-washed, and freed from entrapped water, for example by working on rolls to press out the water, followed by drying at a suitable temperature (e. g., at room temperature) under atmospheric pressure (preferably in a stream of dry air) or at subatmospheric pressures to remove the last traces of water. The dried copolymer, alone or with a dye, pigment, filler, plasticizer, lubricant, polymerization catalyst or other modifying agent, may be molded under heat and pressure, e. g., at 140° C. to 170° C. and under a pressure of 2000 to 5000 pounds per square inch.

EXAMPLE 10

| | Parts |
|---|---|
| Diallyl tetrafluorosuccinate | 180 |
| 2-cyanoethyl vinyl ether | 20 |
| α,α'-Azodiisobutyronitrile | 2 | are heated together for 3 hours at 105° C., yielding an insoluble copolymeric solid. This copolymer supports combustion less readily, that is, it burns more slowly, than polymeric (homopolymeric) diallyl succinate, and is suitable for uses, e. g., in electrically insulating applications, in making flame-resistant laminated articles, etc., for which polymeric diallyl succinate would be either wholly unsuited or would have only limited utility.

EXAMPLE 11

| | Parts |
|---|---|
| Cyanomethyl vinyl ether | 25.0 |
| Methyl methacrylate | 25.0 |
| α,α'-Azodiisobutyronitrile | 0.5 | are mixed together and charged to a heavy-walled glass tube, which thereafter is sealed under vacuum. Copolymerization is effected by heating the sealed tube in a 60° C. water bath for 18 hours. The resulting copolymer can be molded under heat and pressure to yield a wide variety of molded articles for domestic and industrial uses.

EXAMPLE 12

| | Parts |
|---|---|
| 2-cyanoethyl vinyl ether | 7.5 |
| Vinylidene chloride | 142.5 |
| α,α'-Azodiisobutylonitrile | 1.5 | are mixed and heated together in a closed vessel for 24 hours at 40° C., yielding a white, opaque, powdery, solid, thermoplastic copolymer of vinylidene chloride and the said vinyl ether. This copolymer can be hot drawn to obtain monofilaments, rods, bars, tubes, etc., having a wide variety of commercial uses.

EXAMPLE 13

One hundred (100) grams of acrylamide, 10 grams of cyanomethyl vinyl ether and 10 ml. of 30% hydrogen peroxide are added to 500 ml. of distilled water. The polymerization of the mixture is carried out at 60° C. for 48 hours. The water-soluble copolymer which forms is precipitated by pouring the reaction mass into methanol. The resinous product is washed with methanol and dried.

Instead of acrylamide, an equivalent amount of methacrylamide man be substituted to obtain the corresponding resinous methacrylamide copolymer.

The above copolymers, and especially their formaldehyde-reaction products, are particularly useful in textile-sizing, adhesive, paper, soil-conditioning and soil stabilization compositions and applications.

In Table I are given the results of copolymerizing 2-cyanoethyl vinyl ether with other comonomers, using either 10% or 50%, by weight of total monomers, of 2-cyanoethyl vinyl ether, and 1% of the specified catalyst based on the total weight of the monomeric mixture. The copolymerization is effected by heating the reaction vessel containing the homogeneous mixture of monomers plus catalyst for 1 hour at 80°–90° C.

TABLE I

| Exam. No. | Comonomer | Percent Comonomer | Catalyst | Appearance of Copolymer |
|---|---|---|---|---|
| 14 | Styrene | 90 | Porophor N [1] | Hard, clear solid. |
| 15 | do | 50 | do | Sticky, white, opaque paste. |
| 16 | Acrylonitrile | 90 | do | White, granular solid. |
| 17 | do | 50 | do | Amber-colored resin. |
| 18 | 2-Methyl-5-vinyl-pyridine. | 90 | Benzoyl peroxide | Clear, dark-brown resin. |
| 19 | do | 50 | Porophor N | Initially a syrup, but a yellow, solid copolymer is obtainable by pptn. with hexane. |
| 20 | Acrylamide | [2] 90 | do | Hard, white, tacky solid after evaporation of benzene. |
| 21 | do | 50 | do | Hard, white, tacky solid. |
| 22 | Ethyl acrylate | 90 | do | Colorless, clear, hard solid. |

[1] Porophor N is alpha,alpha'-azodiisobutyronitrile.
[2] Reaction mixture comprised 10 parts 2-cyanoethyl vinyl ether, 90 parts acrylamide, about 44 parts benzene and 1 part Porophor N.

EXAMPLE 23

| | Parts |
|---|---|
| 2-cyanoethyl vinyl ether | 100 |
| Vinyl acetate | 100 |

To a homogeneous mixture of the above comonomers at room temperature (about 20–25° C.) is added about 1 part of boron trifluoride in the form of the etherate thereof. Copolymerization (exothermic) begins immediately, yielding a dark, viscous liquid copolymer composition after standing for 1 hour.

EXAMPLE 24

Same as in Example 23 with the exception that 100 parts of ethyl acrylate is substituted for 100 parts of vinyl acetate. This copolymerization reaction also is exothermic, yielding a dark, gummy copolymer after 1 hour.

EXAMPLE 25

Same as in Example 24 with the exception that the polymerization catalyst is anhydrous aluminum chloride (1 part). In this example, too, the copolymerization reaction is exothermic, yielding a dark, viscous, liquid copolymer composition almost immediately. This liquid is converted into a gummy, solid copolymer after standing for 12 days at room temperature.

EXAMPLE 26

A spinning solution is prepared by dissolving 50 parts of an acrylonitrile copolymer (obtained by polymerizing a mixture of 95% acrylonitrile and 5% 2-cyanoethyl vinyl ether as described under Example 3) in an amount of a concentrated aqueous solution of sodium thiocyanate (about 49% NaSCN in water) such that the concentration of copolymer in this solution is about 12%. The resulting solution is filtered, placed under vacuum and allowed to deaerate for 3 days.

The spinning solution thereby obtained is spun into a fiber by extruding it through a spinneret having 45 holes, each 75 microns in diameter, into a coagulating bath comprising water maintained at a temperature of about 0° C. The freshly spun fiber in gel state is continuously passed over a pair of converging wash rolls while it is advancing in a helical path. The fiber is rinsed with water on the rolls to remove excess thiocyanate. The washed fiber is stretched 820%, for example by passing it through a both of hot water maintained at a temperature of about 99.5° C., followed by drying on converging drying rolls while it is moving in a helical path toward the take-off end as is more fully described in Cresswell et al. Patent No. 2,558,733.

The gelled fiber can be more highly stretched, without breaking, than a fiber similarly prepared from homopolymer acrylonitrile.

EXAMPLE 27

Example 26 is repeated using, instead of the two-component copolymer of that example, a ternary polymer obtained by polymerizing a mixture of 90% acrylonitrile, 5% 2-methyl-5-vinylpyridine and 5% 2-cyanoethyl vinyl ether following the same general procedure employed in making the two-component copolymer of Example 3. The resulting fiber has better dyeability, especially toward acid dyes, than the fiber of Example 26 or than a fiber similarly produced from homopolymeric acrylonitrile.

It will be understood, of course, by those skilled in the art that our invention is not limited to the particular comonomers named in the above illustrative examples, nor to the particular proportions thereof, nor to the particular methods of copolymerization given therein. Thus, instead of the specific polymerization catalysts employed in the individual examples, any other polymerization catalyst, numerous examples of which have been mentioned hereinbefore, can be used. Also, instead of cyanomethyl vinyl ether and 2-cyanoethyl vinyl ether employed in the individual examples, any other cyanoalkyl vinyl ether of the kind embraced by Formula I (or mixtures thereof in any proportions) can be used in place of all or part of the specific cyanoalkyl vinyl ether specified in the particular example.

Additional variations also will be apparent to those skilled in the art, including the use of other comonomers (or mixtures of comonomers in any proportions) other than those employed in the individual example for copolymerization with the cyanoalkyl vinyl ether. Depending upon the particular properties desired in the copolymer composition and the specific use intended for the composition, the comonomer can be varied within the limits hereinbefore set forth, as desired or as conditions may require, so long as it contains one or more $CH_2=C<$ groupings, is different from the cyanoalkyl vinyl ether used in practicing our invention, and is compatible and copolymerizable therewith. A particularly suitable and preferred comonomer is N-vinyl-2-oxazolidone. Another very suitable sub-class are the various vinylpyridines, including those represented by the formula V 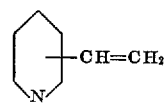

and which include 2-vinylpyridine, 3-vinylpyridine and 4-vinylpyridine; and methyl vinylpyridines embraced by the formula VI 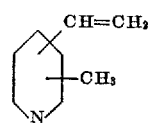

including, specifically, 2-methyl-5-vinylpyridine, 2-methyl-3-vinylpyridine, 3 - vinyl - 4 - methylpyridine, 3-vinyl-5-methylpyridine, 2 - vinyl - 3 - methylpyridine, 2-vinyl-4-methylpyridine, 2-vinyl-5 - methylpyridine, 2 - vinyl - 6- methylpyridine, 2-methyl-4-vinylpyridine and 3-methyl-4-vinylpyridine. The vinylpyridines embraced by Formula VI are a preferred sub-group within a broader class of vinylpyridines that are advantageously employed in making ternary polymers secured by practicing the present invention and which may be represented by the formula VII 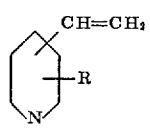

and wherein R represents a lower alkyl radical, more particular a methyl, ethyl, propyl (including n-propyl and isopropyl) or butyl (including n-butyl, isobutyl, sec.-butyl and tert.-butyl) radical. Other examples include 2-vinyl-4,6-dimethylpyridine, the 2- and 4-vinylquinolines, 2-vinyl-4,6-diethylpyridine and others embraced by the formula VIII 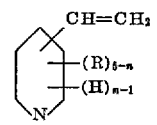

wherein R represents a lower alkyl radical, examples of which have been given hereinbefore, and $n$ represents an integer from 1 to 5, inclusive.

Other very suitable sub-classes that may be mentioned and which include comonomers which are preferred for use in making preferred cyanoalkyl vinyl ether copolymer compositions of this invention are: cyanoalkyl esters of an acrylic acid, e. g., mono-, di- and tricyanomethyl esters of acrylic acid, methacrylic acid, etc., the mono-, di- and tri-(beta-cyanoethyl) esters of acrylic acid, methacrylic acid, etc.; and compounds which are copolymerizable with cyanoalkyl vinyl ethers of the kind used in practicing the present invention and which are represented by the general formula IX 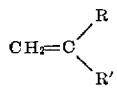

where R represents a member of the class consisting of hydrogen, halogen (chlorine, fluorine, bromine or iodine), alkyl (e. g., methyl, ethyl, propyl, butyl to octadecyl, inclusive), including cycloalkyl (e. g., cyclohexyl, etc), aryl (e. g., phenyl, xenyl, naphthyl, etc.), alkaryl (e. g., tolyl, xylyl, ethylphenyl, etc.), aralkyl (e. g., benzyl, phenylethyl, etc.) and R' represents an aryl radical or a radical represented by the formula

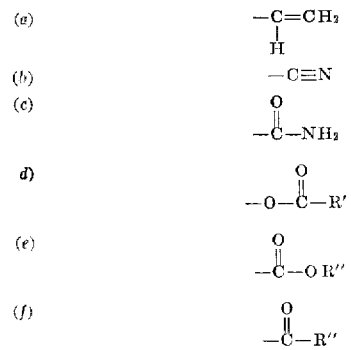

where R'' represents an alkyl, alkoxyalkyl (e. g., methoxymethyl, methoxyethyl, ethoxyethyl, ethoxypropyl, propoxybutyl, etc.) or a carbocyclic radical (e. g., aryl, alkaryl, hydroaromatic, etc). Examples of compounds embraced by the aforementioned general formula

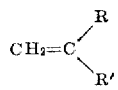

are the vinyl esters (e. g., vinyl acetate, etc), methyl vinyl ketone, isoprene, 1,3-butadiene, 2-chloro-1,3-butadiene, acrylonitrile, acrylamide, methacrylamide, various esters of acrylic acid (e. g., methyl acrylate, ethyl acrylate, cyclohexyl acrylate, tetrahydronaphthyl acrylate, decahydronaphthyl acrylate, methoxyethyl acrylate, ethoxyethyl acrylate, etc.), as well as others that will be obvious to those skilled in the art.

The polymerizable compositions comprising a mixture of a cyanoalkyl vinyl ether of the kind embraced by Formula I and one or more other compatible, copolymerizable compounds containing a $CH_2=C<$ grouping or a plurality of such groupings, in the weight proportions of from about 5% to about 65% (e. g., 10 or 20% to 50 or 60%) of the former to from about 35% to about 95% (e. g., 40 or 50% to 80 or 90%) of the latter have a wide variety of applications. For instance, with or without a filler they can be used in the production of molding compositions and molded articles; as the binder in the production of laminated articles; while those which are normally liquids or are convertible into liquids, e. g., by dissolving in a suitable solvent, can be employed as coating compositions (or as components of such compositions) for use in finishes for wood, metals, plastics, etc., or in the treatment of fibrous materials, e. g., paper, cloth, leather, etc., or as impregnants for various porous materials such as porous metal castings, ceramic ware, fibrous materials of all kinds, etc. In using the polymerizable compositions or the liquid copolymers in the production of laminated articles, a fibrous material, e. g., paper or sheets of cloth, asbestos, etc., is impregnated with the polymerizable composition or liquid copolymer. The dried, impregnated sheets are superimposed and bonded together under heat (e. g., at 40°–200° C.) and pressure, for example at pressures ranging from contact pressure up to 4,000 or 5,000 or more pounds per square inch depending upon the particular composition employed. For many purposes where high strength materials are required, glass cloth is especially suitable for the production of laminates, but other fibrous materials can be employed in addition to those aforementioned, e. g., those composed of or comprising cellulose esters (e. g., cellulose acetate), regenerated cellulose fibers (e. g., viscose and cuprammonium rayons, etc.), other synthetic fibers (e. g., nylon, polyacrylonitrile fibers, fibers formed from polymeric and copolymeric vinylidene chloride compositions, etc.), as well as others. Our polymerizable compositions and liquid copolymers also may be used in various electrically insulating applications, e. g., as coil impregnants.

The copolymers of this invention can be produced in various molecular weights as desired or as conditions may require. Thus, the fiber-forming copolymers, more particularly the fiber-forming acrylonitrile copolymers to the production of which our invention is especially applicable, ordinarily are within the range of about 15,000 to about 300,000 or higher as calculated from viscosity measurements using the Staudinger equation (reference: U. S. Patent No. 2,404,713). Homogeneous acrylonitrile copolymers having an average molecular weight of between about 60,000 and 90,000 and which contain at least 70%, advantageously from about 80% to about 95% of acrylonitrile (combined acrylonitrile) in the molecule, are especially suitable for use in making dyeable, oriented fibers by wet- or dry-spinning methods. In making such fiber-forming acrylonitrile copolymers, the acrylonitrile generally constitutes a major or preponderant proportion (more than 50%) by weight of the total weight of monomers to be copolymerized, the cyanoalkyl vinyl ether constitutes from about 5% to about 15 or 20%, or in some cases as high as 25 or 30%, of the total weight of the acrylonitrile and cyanoalkyl vinyl ether, and any modifying comonomer or comonomers (if present in the polymerizable mixture) constitute the remainder of the total amount of copolymerizable ingredients which are subjected to copolymerization. The modifying comonomer may be different monoethylenically unsaturated compound, examples of which have been given hereinbefore. Especially suitable for this purpose are, for instance, vinyl acetate, acrylamide, methyl acrylate, any of the various vinyl-substituted heterocyclic tertiary amines, e. g., the various vinylpyridines, and others.

The copolymers of our invention also are particularly useful in the production of molded articles. The compositions may be employed alone or admixed with a filler, dye, pigment, opacifier, lubricant, etc. Among the fillers that can be employed are alpha-cellulose pulp, asbestos fibers, cotton flock, chopped cloth cuttings, glass fibers, wood flour, mica dust, antimony oxide, titanium dioxide, sand, clay, diatomaceous earth, etc.

The liquid polymerizable compositions and liquid copolymers which are capable of undergoing polymerization or further copolymerization to solid state also may be used in the production of castings. Such compositions likewise can be employed as adhesives, for instance, in the production of optical devices containing a plurality of elements, examples of which are compound lenses, compound prisms, Nicol prisms, etc.

Natural or synthetic resins and other modifiers can be incorporated into the copolymeric compositions of our invention in order to modify the latter and obtain products which are especially suited for a particular application. Examples of such modifying agents are shellac, ester gum, cellulose esters and ethers, urea-aldehyde resins, aminotriazine-aldehyde resins (e. g., melamine-formaldehyde resins), phenol-aldehyde resins, hydrocarbon-substituted polysiloxane resins, e. g., methyl polysiloxane resins, methyl phenyl polysiloxane resins, phenyl polysiloxane resins, alkyd resins, etc. Our copolymeric compositions also can be modified by incorporating therein various rubbery products such as those which comprise natural rubber, synthetic rubber-like materials, as well as mixtures thereof.

We claim:
1. The method of preparing an acrylonitrile copolymer which comprises polymerizing a mixture of copolymerizable ingredients including (1) acrylonitrile and (2) a cyanoalkyl vinyl ether represented by the general formula

$$CN-R-O-CH=CH_2$$

where R represents a divalent saturated aliphatic hydrocarbon radical containing from 1 to 6 carbon atoms, inclusive, the acrylonitrile of (1) constituting at least about 50% by weight and the cyanoalkyl vinyl ether of (2) constituting at least about 5% by weight of the total amount of (1) and (2), and the said polymerization being effected with the aid of a polymerization catalyst selected from the class consisting of free-radical catalysts and ionic catalysts.

2. A method as in claim 1 wherein the cyanoalkyl vinyl ether is cyanomethyl vinyl ether.

3. A method as in claim 1 wherein the cyanoalkyl vinyl ether is 2-cyanoethyl vinyl ether.

4. A method as in claim 1 wherein the polymerization catalyst is a free-radical polymerization catalyst.

5. A method as in claim 4 wherein the free-radical polymerization catalyst is alpha,alpha'-azodiisobutyronitrile.

6. A method as in claim 1 wherein the mixture of copolymerizable ingredients additionally includes a vinylpyridine.

7. A method as in claim 1 wherein the acrylonitrile constitutes at least about 85% by weight of the mixture of copolymerizable ingredients.

8. The method of preparing an acrylonitrile copolymer which comprises polymerizing a mixture of copolymerizable ingredients consisting of, by weight, about 90% acrylonitrile, about 5% 2-methyl-5-vinylpyridine and about 5% 2-cyanoethyl vinyl ether, and the said polymerization being effected with the aid of a free-radical polymerization catalyst.

References Cited in the file of this patent

UNITED STATES PATENTS 2,631,995     Bruson _____ Mar. 17, 1953

FOREIGN PATENTS 454,292     Canada _____ Jan. 25, 1949

OTHER REFERENCES

Van Nostrand Chemists' Dictionary—2nd printing October 1953. See page 20 "alkyl."

UNITED STATES PATENT OFFICE

CERTIFICATE OF CORRECTION

Patent No. 2,813,847

November 19, 1957

David C. Guth et al.

It is hereby certified that error appears in the printed specification the above numbered patent requiring correction and that the said Letters Patent should read as corrected below.

Column 2, line 21, for "compounds" read -- compound --; column 8, line 42, for "man" read -- can --; column 9, line 46, for "both" read -- bath --; column 12, line 39, after "be" insert -- a --.

Signed and sealed this 14th day of January 1958.

(SEAL)
Attest:

L H. AXLINE
Attesting Officer

ROBERT C. WATSON
Commissioner of Patents